(12) United States Patent
Masuko

(10) Patent No.: US 10,128,680 B2
(45) Date of Patent: Nov. 13, 2018

(54) CONSTANT CURRENT CHARGING DEVICE

(71) Applicant: SII Semiconductor Corporation, Chiba-shi, Chiba (JP)

(72) Inventor: Hiroyuki Masuko, Chiba (JP)

(73) Assignee: ABLIC INC., Chiba (JP)

( * ) Notice: Subject to any disclaimer, the term of this patent is extended or adjusted under 35 U.S.C. 154(b) by 163 days.

(21) Appl. No.: 15/155,576

(22) Filed: May 16, 2016

(65) Prior Publication Data

US 2016/0344201 A1 Nov. 24, 2016

(30) Foreign Application Priority Data

May 18, 2015 (JP) .................................. 2015-101397

(51) Int. Cl.
*H02J 7/00* (2006.01)

(52) U.S. Cl.
CPC .................................. *H02J 7/0083* (2013.01)

(58) Field of Classification Search
USPC ......................................................... 320/107
See application file for complete search history.

(56) References Cited

U.S. PATENT DOCUMENTS

| | | | |
|---|---|---|---|
| 2008/0180061 A1* | 7/2008 | Koski | H01M 10/441 320/117 |
| 2009/0121682 A1* | 5/2009 | Goto | H01M 2/34 320/134 |
| 2013/0207618 A1* | 8/2013 | Renken | H01M 10/425 320/155 |

FOREIGN PATENT DOCUMENTS

JP 61-26438 A 2/1986

* cited by examiner

*Primary Examiner* — Robert Grant
(74) *Attorney, Agent, or Firm* — Brinks Gilson & Lione

(57) ABSTRACT

To provide a constant current charging device capable of shortening a total charging time of a secondary battery even if an internal impedance of the secondary battery becomes high. A constant current charging device is provided which is equipped with a charging completion voltage detector, a battery voltage drop detector, an up-down counter which adds data when the up-down counter receives a detection signal of the charging completion voltage detector, subtracts the data when the up-down counter receives a detection signal of the battery voltage drop detector, and outputs the subtracted data, and a constant current generating circuit which switches a charging current to a secondary battery according to the data outputted from the up-down counter.

4 Claims, 4 Drawing Sheets

CONSTANT CURRENT CHARGING DEVICE

RELATED APPLICATIONS

This application claims priority under 35 U.S.C. § 119 to Japanese Patent Application No. 2015-101397 filed on May 18, 2015, the entire content of which is hereby incorporated by reference.

BACKGROUND OF THE INVENTION

Field of the Invention

The present invention relates to a charging device for charging a rechargeable battery such as a lithium ion secondary battery, and more particularly to a constant current charging device suitable for quick charging.

Background Art

There are several methods to charge a secondary battery. As a typical charging method, there may be mentioned constant current charging. FIG. 4 is a diagram illustrating a charging current I and a battery voltage VBAT in conventional constant current charging.

At an initial time of charging, the secondary battery is charged with a large current. When the battery voltage VBAT rises and reaches a charging completion voltage VEND (e.g., 4.2V), the charging current is switched to a current which gradually becomes lower. At last, the secondary battery is charged with a prescribed minimum current. When the charging completion voltage VEND is reached, the charging is completed.

[Patent Document 1] Japanese Patent Application Laid-Open No. H8-203563

SUMMARY OF THE INVENTION

In a lithium ion secondary battery small in size and low in cost, the internal impedance thereof has recently been in a trend for increase as compared with other lithium ion secondary batteries.

In the conventional constant current charging, when the internal impedance is high, a drop voltage of the battery voltage becomes large at timings t1, t2 and so on provided for charging current switching, and the amount of the voltage charged after the switching of the charging current increases. Therefore, the time for charging at each constant current value becomes long, and the total charging time becomes long. Further, when the internal impedance becomes high, the detection of the voltage of the secondary battery becomes easy to be affected by external noise. When the voltage of the secondary battery instantaneously exceeds the charging completion voltage VEND due to the external noise, the charging current is switched irrespective of the charging completion voltage VEND being not reached, so that the time taken up to the completion of charging becomes long.

The present invention has been invented to solve the above problems and provides a constant current charging device capable of shortening a charging time even though an internal impedance of a secondary battery is high.

In order to solve the related art problems, the constant current charging device of the present invention which quickly charges the secondary battery is configured as follows:

The constant current charging device is provided which includes a charging completion voltage detector which detects that the voltage of a secondary battery reaches a prescribed charging completion voltage, a battery voltage drop detector which detects a drop in the voltage of the secondary battery, based on a detection voltage lower than the charging completion voltage, an up-down counter which adds data when the up-down counter receives a detection signal of the charging completion voltage detector and subtracts the data when the up-down counter receives a detection signal of the battery voltage drop detector, and outputs the subtracted data therefrom, and a constant current generating circuit which switches a charging current to the secondary battery according to the data outputted from the up-down counter.

Since the constant current charging device of the present invention is configured in the above-described manner, a charging time can be shortened irrespective of the internal impedance of the secondary battery.

DESCRIPTION OF THE PREFERRED EMBODIMENTS

The present embodiment will hereinafter be described with reference to the accompanying drawings.

Figure 1:
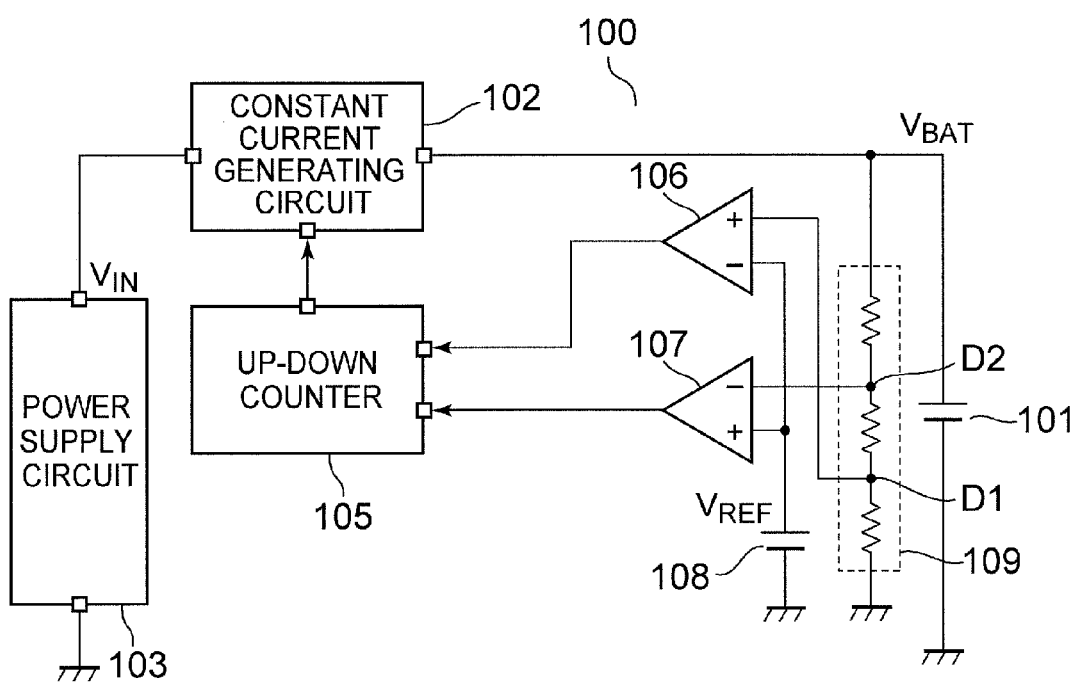
FIG. 1 is a block diagram of a constant current charging device according to the present embodiment.

FIG. 1 is a block diagram of a constant current charging device according to the present embodiment.

The constant current charging device 100 is equipped with a power supply circuit 103 such as a DC-DC converter, a constant current generating circuit 102, a voltage division circuit 109, a reference voltage generating circuit 108, a charging completion voltage detector 106, a battery voltage drop detector 107, and an up-down counter 105.

The constant current generating circuit 102 is inputted with an output voltage VIN of the power supply circuit 103 and supplies current to a secondary battery 101. The voltage division circuit 109 is connected across the secondary battery 101 and divides a battery voltage VBAT. The reference voltage generating circuit 108 generates a reference voltage VREF. The charging completion voltage detector 106 is inputted with a voltage VD1 of a node D1 of the voltage division circuit 109 and the reference voltage VREF and compares them with each other to detect a charging completion voltage VEND. The battery voltage drop detector 107 is inputted with a voltage VD2 of a node D2 of the voltage division circuit 109 and the reference voltage VREF and compares them with each other to detect a voltage VSTP lower than the charging completion voltage VEND. The up-down counter 105 performs up count on the basis of a detection signal of the charging completion voltage detector 106 and performs down count on the basis of a detection signal of the battery voltage drop detector 107, and inputs an output signal to an input terminal of the constant current generating circuit 102.

The output signal of the up-down counter 105 is defined as a signal corresponding to the number N (where N is a natural number of 2 or more) of steps of current to be switched. As this signal, there may be mentioned N signals or a bus signal defined in binary notation, or the like. The constant current generating circuit 102 controls a current value so as to be low each time the input signal approaches N.

The operation of constant current charging in the constant current charging device according to the present embodiment will next be described.

Figure 2:
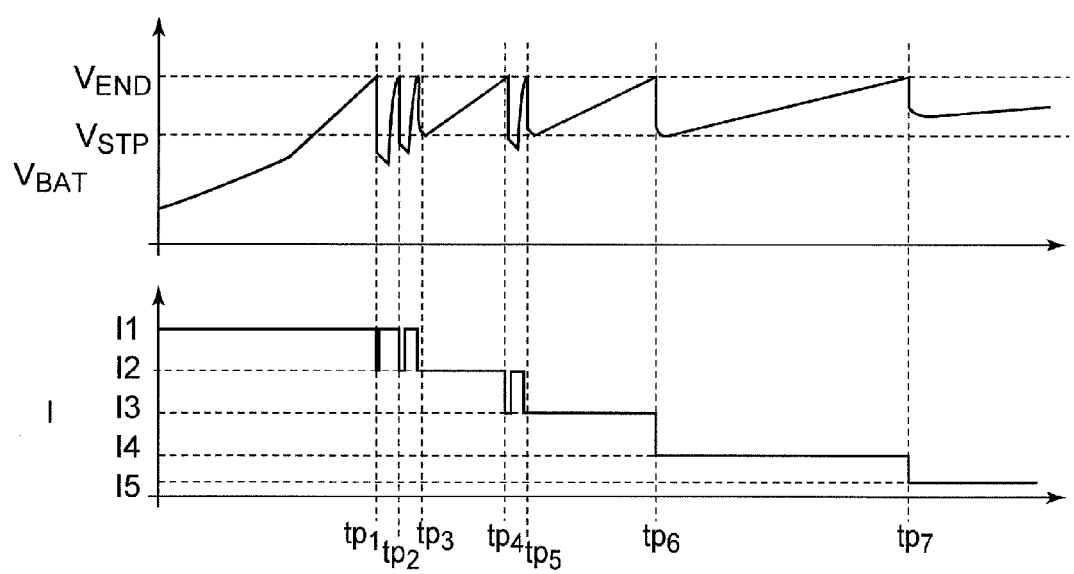
FIG. 2 is a diagram illustrating a charging current and a battery voltage in constant current charging of the present embodiment.

FIG. 2 is a diagram illustrating a charging current and a battery voltage in the constant current charging of the present embodiment. In the constant current charging device according to the present embodiment, the number N of steps of the charging current is assumed to be 5.

Since the up-down counter 105 outputs data "1" at an initial time (time up to tp1) of starting charging, the constant current generating circuit 102 charges the secondary battery 101 with a charging current I1. The secondary battery 101 is charged with the charging current I1 so that the battery voltage VBAT thereof gradually rises. When the battery voltage VBAT reaches the charging completion voltage VEND at the time tp1, the charging completion voltage detector 106 outputs a detection signal (e.g., a Hi level). In response to the detection signal of the charging completion voltage detector 106, the up-down counter 105 adds 1 to the data "1" to output data "2". In response to the data "2", the constant current generating circuit 102 switches the charging current I1 to a charging current I2 equivalent to the data "2" and supplies the charging current I2 to the secondary battery 101.

When the charging current is reduced, the battery voltage VBAT of the secondary battery 101 drops due to the influence of an internal impedance. When the battery voltage VBAT falls below the detection voltage VSTP, the battery voltage drop detector 107 outputs a detection signal (e.g., a Hi level). In response to the detection signal of the battery voltage drop detector 107, the up-down counter 105 subtracts 1 from the data "2" to output data "1". In response to the data "1", the constant current generating circuit 102 switches to the charging current I1 equivalent to the data "1" and supplies the charging current I1 to the secondary battery 101 again.

When the battery voltage VBAT reaches the charging completion voltage VEND again at a time tp2, the up-down counter 105 outputs data "2" in like manner, and the constant current generating circuit 102 reduces the charging current from the charging current I1 to the charging current I2. Further, when the battery voltage VBAT drops and falls below the detection voltage VSTP, the charging current is switched to I1.

At a time tp3, when the battery voltage VBAT reaches the charging completion voltage VEND, and the charging current is reduced to I2, the battery voltage VBAT does not fall below the detection voltage VSTP. Therefore, since the battery voltage drop detector 107 does not output the detection signal, the constant current generating circuit 102 continues charging to the secondary battery with the charging current I2.

When the battery voltage VBAT reaches the charging completion voltage VEND again at a time tp4, the up-down counter 105 outputs data "3" in the same way, and the constant current generating circuit 102 reduces the charging current from the charging current I2 to a charging current I3. Further, when the battery voltage VBAT drops and falls below the detection voltage VSTP, the charging current is switched to I2.

At a time tp5, when the battery voltage VBAT reaches the charging completion voltage VEND, and the charging current is reduced to I3, the battery voltage VBAT does not fall below the detection voltage VSTP. Therefore, since the battery voltage drop detector 107 does not output the detection signal, the constant current generating circuit 102 continues charging to the secondary battery 101 with the charging current I3.

At a time tp6, when the battery voltage VBAT reaches the charging completion voltage VEND again, and the charging current is reduced to I4, the battery voltage VBAT does not fall below the detection voltage VSTP. Therefore, since the battery voltage drop detector 107 does not output the detection signal, the constant current generating circuit 102 continues charging to the secondary battery 101 with the charging current I4.

At a time tp7, when the battery voltage VBAT reaches the charging completion voltage VEND again, and the charging current is reduced to I5, the battery voltage VBAT does not fall below the detection voltage VSTP. Therefore, since the battery voltage drop detector 107 does not output the detection signal, the constant current generating circuit 102 continues charging to the secondary battery 101 with the charging current I5.

The constant current charging device according to the present embodiment continues charging with the charging current I5 with the charging current I5 as the last charging current, and completes charging when the battery voltage VBAT reaches the charging completion voltage VEND.

Figure 3:
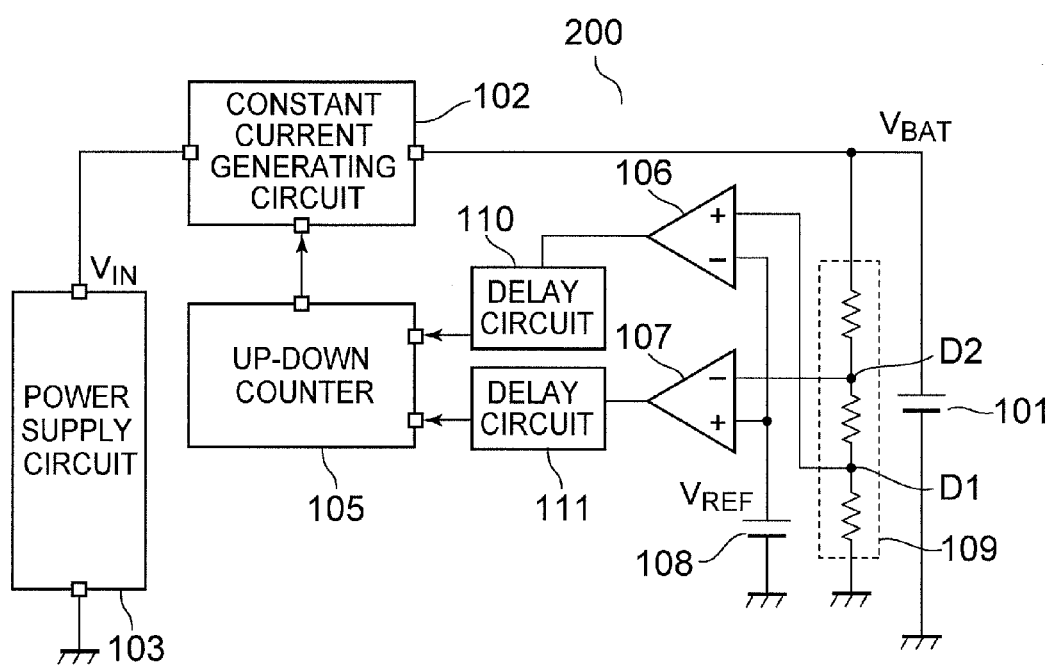
FIG. 3 is a block diagram illustrating another example of the constant current charging device according to the present embodiment.
Figure 4:
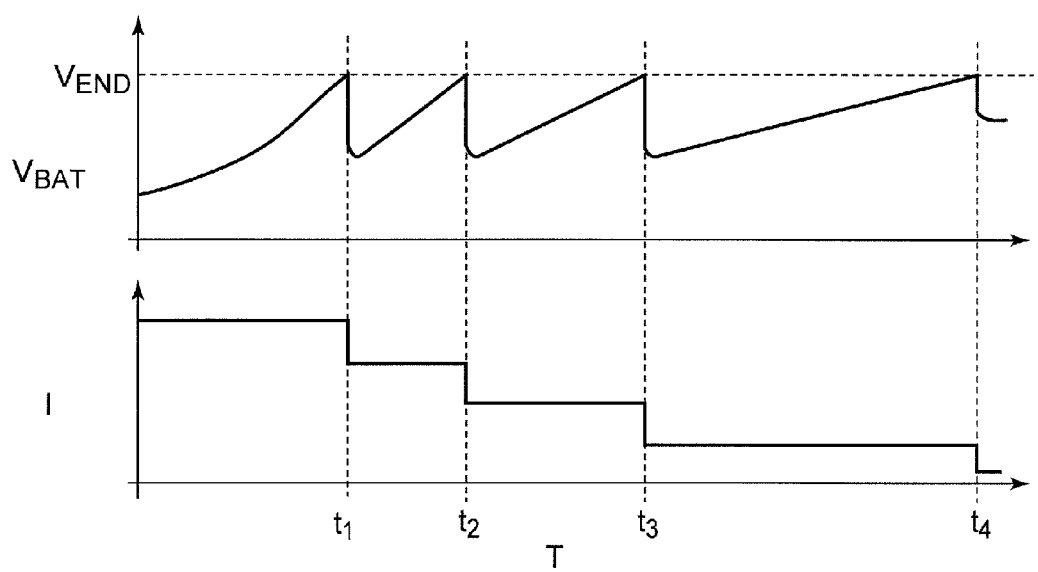
FIG. 4 is a diagram illustrating a charging current and a battery voltage in conventional constant current charging.

FIG. 3 is a block diagram illustrating another example of the constant current charging device according to the present embodiment.

The constant current charging device 200 further includes a delay circuit 110 provided between an output terminal of a charging completion voltage detector 106 and an input terminal of an up-down counter 105, and a delay circuit 111 provided between an output terminal of a battery voltage drop detector 107 and an input terminal of the up-down counter 105. The delay circuit 110 delays a detection signal outputted from the charging completion voltage detector 106 by a preset time and inputs the same to the up-down counter 105. The delay circuit 111 delays a detection signal outputted from the battery voltage drop detector 107 by a preset time and inputs the same to the up-down counter 105.

The delay circuits 110 and 111 have a function of stabilizing switching control of a charging current of a constant current generating circuit 102. Setting the delay time of the delay circuit 110 longer than the delay time of the delay circuit 111 makes it possible to more stabilize the switching control of the charging current of the constant current generating circuit 102.

As described above, according to the constant current charging device of the present embodiment, when the detection voltage VSTP lower than the charging completion voltage VEND is provided, and the battery voltage VBAT falls below the detection voltage VSTP when the charging current is reduced, the procedure of returning the charging current to the current value of the previous stage is added. Consequently, it is possible to shorten the time required to charge the secondary battery irrespective of the characteristics of an internal impedance.

Incidentally, the battery voltage drop detector 107 may be configured to change the detection voltage VSTP according to the charging current of the constant current generating circuit 102. Since a drop in the battery voltage VBAT also becomes small when the charging current becomes small, it is possible to further shorten the charging time by changing the detection voltage VSTP according to the drop.

What is claimed is:

1. A constant current charging device comprising:
a charging completion voltage detector that detects that a voltage of a secondary battery reaches a prescribed charging completion voltage;
a battery voltage drop detector that detects a drop in the voltage of the secondary battery, and outputs a detection signal when the voltage of the secondary battery falls below a detection voltage that is lower than the prescribed charging completion voltage;
an up-down counter that adds data when the up-down counter receives a detection signal from the charging completion voltage detector and subtracts the data when the up-down counter receives the detection signal from the battery voltage drop detector, and outputs the subtracted data therefrom; and
a constant current generating circuit that switches a charging current to the secondary battery according to the data output from the up-down counter.

2. The constant current charging device according to claim 1, further comprising:
a first delay circuit between an output terminal of the charging completion voltage detector and an input terminal of the up-down counter, and
a second delay circuit between an output terminal of the battery voltage drop detector and an input terminal of the up-down counter.

3. The constant current charging device according to claim 2, wherein a delay time of the first delay circuit is longer than a delay time of the second delay circuit.

4. The constant current charging device according to claim 1, wherein the battery voltage drop detector changes the detection voltage according to the data of the up-down counter.

* * * * *